June 24, 1952     H. D. SIMMONS     2,601,640
SOIL TILLING IMPLEMENT
Filed March 10, 1950     3 Sheets-Sheet 1
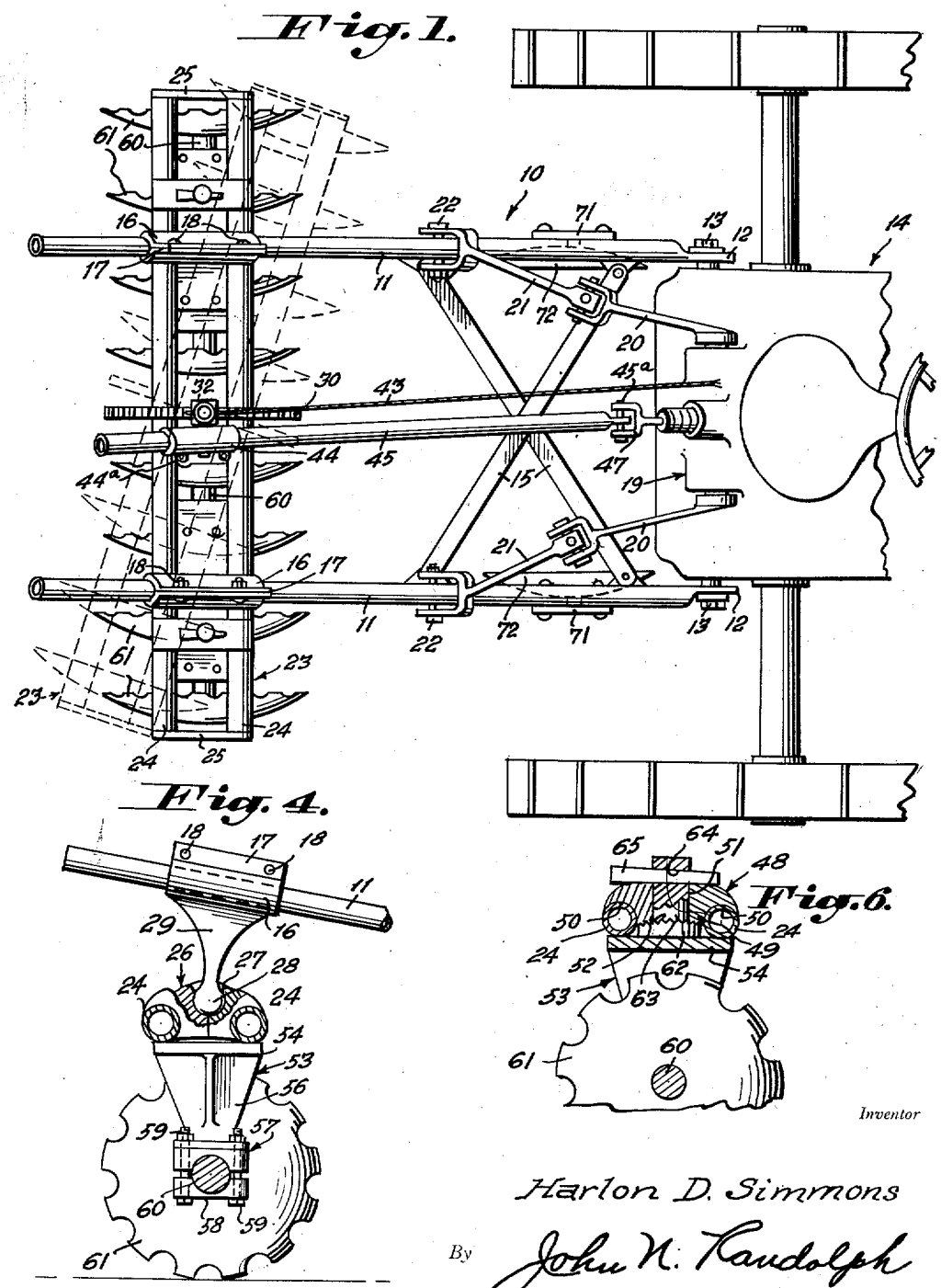
Inventor
Harlon D. Simmons
By John N. Randolph
Attorney June 24, 1952  H. D. SIMMONS  2,601,640
SOIL TILLING IMPLEMENT
Filed March 10, 1950  3 Sheets-Sheet 2
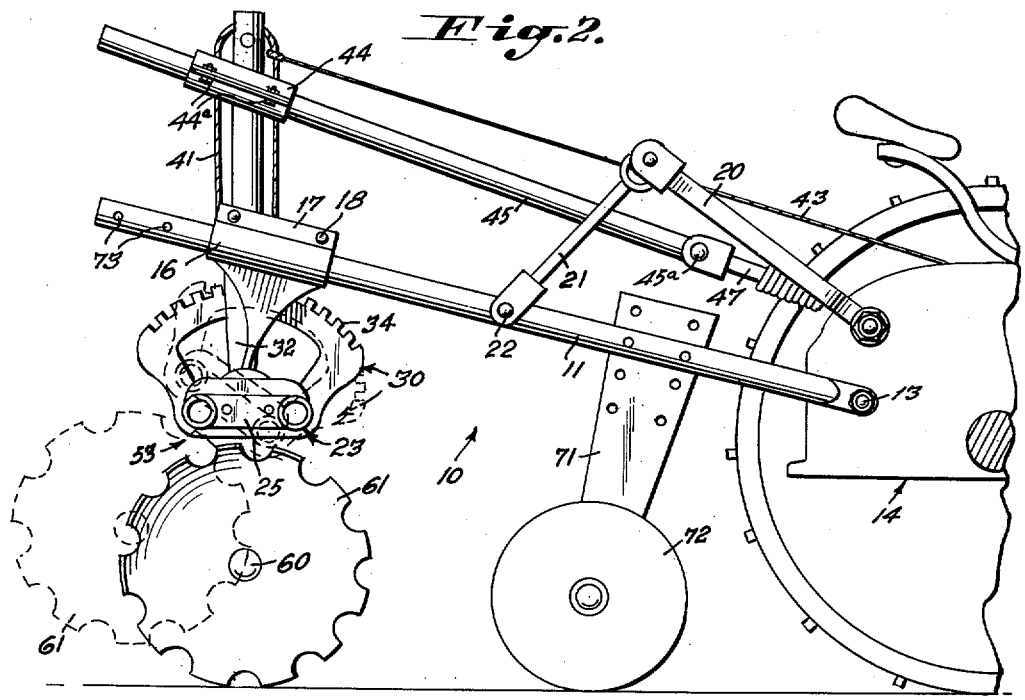
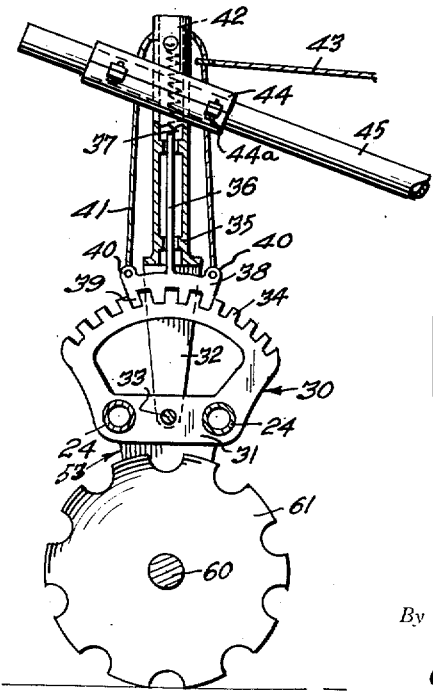
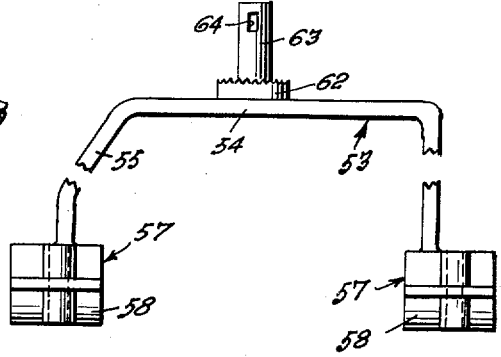
Inventor
Harlon D. Simmons
By John N. Randolph
Attorney June 24, 1952
H. D. SIMMONS
2,601,640
SOIL TILLING IMPLEMENT
Filed March 10, 1950
3 Sheets-Sheet 3
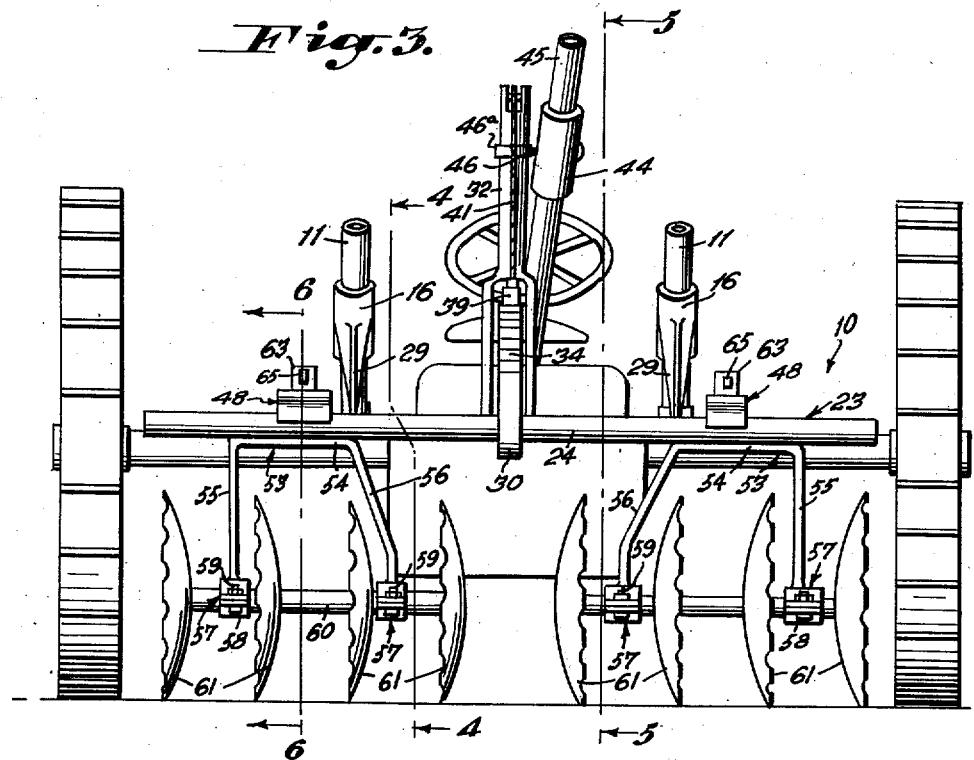
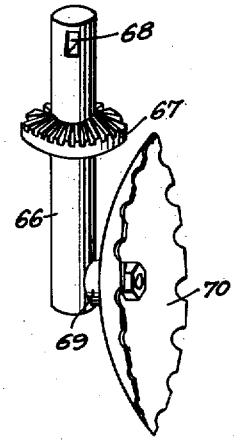
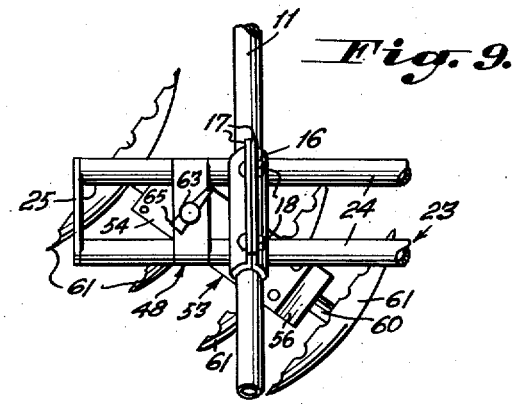
Inventor
Harlon D. Simmons
By John N. Randolph
Attorney Patented June 24, 1952

2,601,640

UNITED STATES PATENT OFFICE 2,601,640

SOIL TILLING IMPLEMENT

Harlon D. Simmons, Tylertown, Miss.

Application March 10, 1950, Serial No. 148,885

7 Claims. (Cl. 97—50)

This invention relates to a novel construction of soil tilling implement especially adapted for use as an attachment for a farm tractor and which is adapted to be detachably supported thereon and drawn behind the tractor.

Another object of the invention is to provide a soil tilling implement especially adapted for use with tractors provided with hydraulic or other lift means and which attachment is adapted to be connected to the tractor lift and adjustably supported thereby at different elevations relatively to the ground.

A further object of the invention is to provide a soil tilling implement of extremely simple construction which may be readily adjusted for supporting a plurality of gangs of disk plows in a number of positions relatively to each other and to a supporting frame structure of the implement for accomplishing various soil tilling operations as for example an outwardly plowed soil bedding operation, a bed leveling operation, a one-way plowing operation and numerous other soil tilling operations.

Still a further object of the invention is to provide a soil tilling implement having means for tilting a supporting frame part thereof whereby different soil engaging elements will be positioned to plow at different depths.

Still a further object of the invention is to provide a structure having means for adjustably positioning gangs of disk blades at different angles with respect to each other and different spaced intervals apart to thus afford an implement possessing a high degree of versatility.

Numerous other objects and advantages of the invention will hereinafter become more fully apparent from the following description of the drawings, illustrating a presently preferred embodiment thereof, and wherein:

Figure 1 is a top plan view of the soil tilling implement shown attached to the rear end of a conventional tractor;

Figure 2 is a side elevational view thereof;

Figure 3 is a rear elevational view of the same;

Figures 4, 5 and 6 are vertical sectional views taken substantially along planes as indicated by the lines 4—4, 5—5 and 6—6, respectively of Figure 3;

Figure 7 is a perspective view of a single breaking disk plow adapted to be mounted in place of one of the disk gangs;

Figure 8 is a side elevational view of one of the disk gang supporting members, and Figure 9 is a fragmentary top plan view illustrating one angular disposition of one of the disk gangs.

Referring more specifically to the drawings, the tractor drawn soil tilling implement in its entirety is designated generally 10 and includes a pair of primary supporting arms 11 each having a forward end 12 which is apertured to receive a laterally projecting pin or trunnion 13 on which said arms 11 are swingably mounted for swinging movement in a vertical plane. The pins or trunnions 13 project laterally from the chassis of a conventional farm tractor, designated generally 14, adjacent the rear end thereof. The supporting arms 11 are connected together adjacent their forward ends by cross braces 15 whereby the supporting arms 11 will swing vertically as a unit. The rear end portions of the supporting arms 11 extend reciprocally through clamping sleeves 16, one of which sleeves engages each of said arms 11 and which sleeves are provided with slotted flange portions 17 extending from end-to-end thereof and connected by nut and bolt fastenings or the equivalent 18 which may be loosened for sliding movement of the arms 11 through the sleeves 16 or tightened for adjustably clamping said sleeves to the supporting arms 11.

The tractor 14 which is of conventional construction is shown provided with a conventional hoist which may be of the hydraulic type and which is designated 19. The hoist 19 is provided with a pair of rearwardly diverging hoist arms 20. A connecting link 21 is pivotally connected to the bifurcated rear end of each hoist arm 20 and said connecting links 21 extend downwardly from the hoist arms and are provided with bifurcated opposite ends which are pivotally connected each by a fastening 22 to one of the supporting arms 11, intermediate of the ends of said supporting arms.

A plow supporting frame, designated generally 23 is disposed beneath the rear end portion of the supporting arms 11 and includes a pair of spaced substantially parallel pipes or tubes 24 which are connected at their ends by spacing members 25. Beneath the sleeves 16, the pipes 24 have connected thereto socket members, designated generally 26 each of which is formed of two corresponding sections having facing sides recessed to form an upwardly opening socket 27 for receiving therein a ball 28 which is formed on the lower end of a restricted shank 29 which depends from the underside of the sleeve 16, disposed thereabove. The ball and socket connections 28, 27 provide a universal connection between the supporting arms 11 and the frame 23 which is thus supported beneath said arms 11.

As best illustrated in Figure 5, a latch segment 30 has a bottom portion 31 through which the pipes 24 extend and to which the latch segment is secured, intermediate of the ends of the frame 23 for mounting the latch segment in an upright position on the frame 23. A lever 32 is pivotally connected at 33 at its lower end to the latch segment portion 31 between the pipes 24 and extends upwardly to substantially above the upper, convex toothed edge 34 of the latch segment 30. The upper portion of the lever 32 is recessed to provide a guide 35 for a rod 36 which is reciprocally disposed therein and which is urged downwardly by an expansion coiled spring 37 which is contained within the recess of the lever 32 and which bears on the upper end of said rod 36. The guide 35 is disposed directly over the toothed upper edge 34 by being offset with respect to the lower end of the lever 32 and said rod 36 is provided at its lower end and beneath the guide 35 and above the toothed portion 34 with a crosshead 38 which extends longitudinally of the toothed portion 34. The crosshead 38 is provided with an integral depending dog 39 at one end thereof for selectively engaging between adjacent teeth of the latch portion 34 and which is urged downwardly into intermeshing engagement with said teeth by the spring 37. If desired, a similar dog could be provided on the opposite end of the crosshead 38. The ends of the crosshead 38 are provided with upstanding apertured ears 40 in which are anchored the ends of a flexible member 41, the intermediate portion of which extends slidably through an opening 42 in the upper portion of the lever 32. A flexible actuating member 43 is connected at one end thereof to the forward half of the flexible member 41 beneath and adjacent the lever opening 42. The flexible member 43 extends forwardly to a position adjacent the operator's seat of the tractor 14 so that the latch dog 39 may be disengaged from the toothed segment 34 by the tractor operator, while seated on the tractor. As previously stated, the latch segment 30 and lever 32 are disposed intermediate of the ends of the frame 23 and one of the socket members 26 is disposed on either side of the latch segment 30 substantially equally spaced from said latch segment and from an end of the frame 23, as best illustrated in Figure 1.

A split sleeve 44 having flanges connected by fastenings 44a, similar to the sleeve 16, has a pin or trunnion 46 projecting laterally therefrom, intermediate of its ends and which is journalled in a collar 46a which is swivelly mounted on an upper portion of the lever 32. An auxiliary supporting arm 45 has a rear end portion extending through and adjustably clamped in the sleeve 44 and extends forwardly therefrom and is pivotally connected at 45a at its forward end to a centrally disposed tractor element 47 which is located above the level of the journals 13.

A yoke member 48 is supported on the frame 23, adjacent each end thereof and includes a depending intermediate portion 49 which extends downwardly between the pipes 24 and corresponding end portions each having a convex underside 50 forming surfaces which engage flush on the upper halves of the pipes 24, as best illustrated in Figure 6. Each yoke member 48 is provided with a central bore 51 extending therethrough from top to bottom thereof and the bottom surface of the intermediate portion 49 around the bore 51 is provided with a toothed surface 52. A substantially yoke-shaped bearing hanger 53, as best illustrated in Figure 3, includes an intermediate portion 54 and depending end portions or legs 55 and 56 each of which terminates in a bearing, designated generally 57 which is formed of sections including a detachable half bearing section 58 which is detachably mounted by nut and bolt fastenings 59 so that the bearings 57 can be engaged with a shaft 60 mounting a plurality of disk blades 61 without removing the disks 61 from said shaft 60. The shafts 60 are journalled in the bearings 57 of the two bearing hangers 53 and each shaft 60, with the disks 61 carried thereby form a disk gang. The intermediate portion 54 of each hanger 53 is provided with an upstanding enlargement 62, the upper surface of which is likewise provided with an annular upwardly facing toothed portion for intermeshing engagement with the downwardly facing toothed surface 52. A stem 63 extends upwardly from the center portion of the enlargement 62 through the bore 51 and is provided adjacent its upper end with a tapered transverse bore 64 for receiving a wedge-shaped pin 65 which is removably mounted therein. The bore 64 has its bottom portion disposed slightly below the top surface of the yoke member 48 when the teeth 52 are in mesh with the teeth of the projection 62 so that the wedge-shaped pin 65 when driven through the bore 64 will tend to displace the hanger 53 upwardly thereby retaining said toothed portions in meshing engagement and clamping the top surface of the intermediate hanger portion 54 against the pipes 24 to prevent the yoke 48 and hanger 53 from sliding longitudinally of the frame 23. However, when pin 65 is removed, allowing the hanger 53 to be displaced downwardly out of clamping engagement with the frame 23, each yoke 48 and the hanger 53 which is supported thereby may be adjusted longitudinally of the frame 23 or transversely of the soil tilling implement 10.

Figure 7 illustrates a single breaking disk plow which may be substituted for either disk gang 60, 61 by removal of the disk gang and the hanger 53. The single breaking disk plow comprises a standard 66 provided intermediate of its ends with a collar 67 which corresponds to the enlargement 62 and has upwardly facing teeth to engage one of the toothed portions 52. The upper end of the standard 66 corresponds to the stem 63 and is adapted to engage one of the bores 51 and has a transverse bore 68, corresponding to the bore 64 for receiving one of the wedge pins 65. The lower end of the standard 66 has a transversely extending stub axle 69 on which a single disk 70 is journalled.

From the foregoing it will be readily apparent that the tractor hoist arm 20 may be swung upwardly or downwardly for raising or lowering the supporting arms 11 on their pivots 13 for raising or lowering, respectively the frame 23 and the disk blades supported therebeneath so that the disk blades may be disposed at any level with respect to the ground surface or may be elevated completely out of engagement therewith. As previously stated, by disengaging the wedge pins 65 the disk gangs 60, 61 may be rotated through a complete circle relatively to the supporting frame 23; and the yokes 48, with the disk gangs, may be displaced longitudinally of the frame 23. The implement 10 may be adjusted to various positions for various soil operations, as for example, the frame 23 may be disposed in a horizontal plane and parallel to the rear axle of the tractor and with the disk gangs 60, 61 in alignment, as illustrated in full lines in Figure 1, in which positions the disks 61 will all be disposed at the same level to plow the soil at a uniform depth, or the hanger frames 53 may be angularly adjusted with respect to the supporting frame 23 so that the outermost disks of the two disks gangs will be in advance of the adjacent disks to perform an outwardly plowed soil bedding operation. For this latter operation, the latch dog 39 is disengaged from the segment 34 by a pull on the member 43 so that the frame 23, with the parts carried thereby is free to swing clockwise on the pivot 33 and relatively to the lever 32 to tilt the supporting frame 23 so that it will be inclined downwardly and forwardly as seen in Figure 2. Thus, the outer, leading disks of the two disk gangs will plow deeper than the adjacent rearwardly disposed disks to correctly accomplish the outwardly plowed soil bedding operation. Likewise, a reverse setting of the frame 23 by swinging it counterclockwise from its position of Figure 5 will cause the adjacently disposed disks of the two disk gangs to be positioned lower than the remotely disposed disks for levelling a previously formed bed. In accomplishing either of these operations, frame 23 also pivots on the ball and socket joints 28, 27. Also, by loosening the clamping sleeves 16, the frame 23 may be disposed at an angle to the rear tractor axle as illustrated in dotted lines in Figure 1 and the two disk gangs set in alignment for one-way plowing. The sleeve 44 may be adjustably clamped to arm 45 to raise or lower the parts supported by frame 23.

In order to compensate for side draft or thrust, where the supporting frame 23 is angularly disposed as illustrated in dotted lines in Figure 1, colter supporting hangers 71 may be secured to and depend from the supporting arms 11 and may support any desired type of colters 72 which act as compensators for neutralizing the side thrust on the implement 10 exerted by the disks 61. Likewise, if desired, a colter or colters 72 may be mounted rearwardly of the disk gangs or at the ends of the frame 23 by the means of the fastening receiving openings 73 as seen in Figure 2.

Various modifications and changes are contemplated and may obviously be resorted to, without departing from the spirit or scope of the invention as hereinafter defined by the appended claims.

I claim as my invention:

1. A soil tilling implement comprising, in combination with a draft vehicle, a supporting frame mounted on and extending longitudinally from one end of the draft vehicle, an implement blade supporting frame disposed beneath and supported by said supporting frame, clamping members mounted on laterally spaced portions of said supporting frame and individually adjustable longitudinally of the supportnig frame, means provided with universal joints forming a connection between said clamping members and the implement blade supporting frame for angularly adjusting the implement blade supporting frame relatively to said first mentioned supporting frame, a plurality of bearing hangers mounted beneath the implement blade supporting frame, each of said bearing hangers providing a support and journal for at least one soil engaging implement blade, and connecting means forming a connection between each bearing hanger and the implement blade supporting frame and detachably clamping the bearing hanger to the implement blade supporting frame in different angularly adjusted positions and at differently spaced intervals with respect to said implement blade supporting frame, a latch segment fixed to and rising from the implement blade supporting frame, a lever pivotally mounted on and rising from said latch segment, a spring projected latch element carried by said lever and normally engaging the latch segment, a clamping sleeve mounted for universal movement on said lever, and an auxiliary supporting arm adjustably clamped in said clamping sleeve and having one end pivotally connected to a part of the draft vehicle for maintaining the implement blade supporting frame in a plurality of angularly adjusted positions relatively to the first mentioned supporting frame.

2. A soil tilling implement comprising, in combination with a draft vehicle, a supporting unit pivotally mounted at one end thereof on the draft vehicle and projecting from an end of the draft vehicle and including laterally spaced supporting arms, a clamping sleeve mounted on each of said supporting arms and individually adjustable relatively thereto, an implement supporting frame disposed beneath said supporting unit and substantially transversely of said clamping sleeves, a universal joint forming a connection between each of the clamping sleeves and the supporting frame whereby said supporting frame may be angularly adjusted relatively to the supporting unit by a selective movement of the clamping sleeves on the supporting arms, a plurality of bearing hangers adjustably supported by and disposed beneath the supporting frame, a clamping unit adjustably clamping each of said bearing hangers to the supporting frame including detachably connected adjustable sections for angularly adjusting each bearing hanger relatively to the axis of the supporting frame, each clamping unit when disengaged being longitudinally adjustable of the supporting frame to vary the spacing between the bearing hangers, and a disk gang supported by and journalled in each of said bearing hangers, an auxiliary stabilizing arm pivotally connected to the draft vehicle and extending from the same end thereof and disposed above said supporting unit, a post rising from the supporting frame and fixedly disposed relatively thereto, a clamping sleeve mounted for universal swinging movement on said post and adjustably clamped to the auxiliary stabilizing arm for angularly adjusting the supporting frame relatively to said supporting unit.

3. A soil tilling implement as in claim 2, and link means connecting said supporting arms intermediate of their ends to a hoist unit of the draft vehicle for raising and lowering the outer end of the supporting unit to vary the elevation of the disk gangs.

4. A soil tilling implement as in claim 2, said post comprising a lever, a latch segment fixed to the supporting frame on which the lower end of the lever is pivotally supported, and a spring pressed latch element carried by said lever and normally engaging the latch segment for latching the lever in a fixed position relatively to said supporting frame.

5. A soil tilling implement as in claim 2, said supporting frame comprising a pair of spaced tubular members and connecting members extending transversely of the tubular members and connected to the ends thereof.

6. A soil tilling implement as in claim 2, said supporting frame comprising a pair of spaced tubular members and connecting members extending transversely of the tubular members and connected to the ends thereof, each of said clamping units including a yoke section slidably mounted on and supported by the tubular members of the supporting frame and a stem section rising from one of the bearing hangers and extending through the yoke section, said yoke section and stem section having interfitting teeth, and wedge means for displacing the stem section through the yoke section to clamp the yoke section and a part of the bearing hanger to the supporting frame and for positioning said toothed portions in interfitting engagement for nonrotatably connecting the clamping sections.

7. A soil tilling implement as in claim 2, said post comprising a lever, a latch segment fixed to the supporting frame on which the lower end of the lever is pivotally supported, a spring pressed latch element carried by said lever and normally engaging the latch segment for latching the lever in a fixed position relatively to said supporting frame, and manually actuated flexible means connected to the latch element and operable from a position remote thereto for retracting the latch element out of engagement with the latch segment.

HARLON D. SIMMONS.

REFERENCES CITED

The following references are of record in the file of this patent:

UNITED STATES PATENTS

| Number | Name | Date |
| --- | --- | --- |
| 696,808 | Gatling | Apr. 1, 1902 |
| 845,902 | Sharp | Mar. 5, 1907 |
| 2,123,555 | Morkovski | July 12, 1938 |
| 2,271,713 | Raska | Feb. 3, 1942 |
| 2,298,499 | Morkoski | Oct. 13, 1942 |
| 2,420,437 | McMahon | May 13, 1947 |
| 2,430,732 | Orelind et al. | Nov. 11, 1947 |